2,695,905

N-FATTYCITRIMIDES

Kendrick R. Eilar, Minneapolis, Minn., assignor to General Mills, Inc., a corporation of Delaware No Drawing. Application June 20, 1952,
Serial No. 294,729

9 Claims. (Cl. 260—326.3)

The present invention relates to N-fattycitrimides having the following formula:

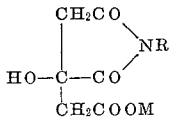

in which R is an aliphatic hydrocarbon group containing from 8 to 22 carbon atoms, and M is hydrogen, ammonium or alkali metal. These compounds are surface active agents, and may be used as wetting agents, foaming agents, detergents, emulsifiers and the like.

It is therefore an object of the present invention to provide novel citrimides having the above formula.

These compounds are made by the reaction of a primary fatty amine with citric acid. The reaction is carried out at temperatures of 150–200° C. until the reaction has gone the desired extent toward completion. The extent of the reaction may be determined from time to time by the titration of a sample. The product obtained is the one containing a free acid group. In order to obtain the salt, the acid is carefully neutralized. The neutralization may be readily accomplished in aqueous media. The preparation of the anhydrous salt may be accomplished by dissolving the acid in hot ethanol, adding a hot solution of sodium hydroxide in ethanol and then cooling the mixture. The ammonium salt may be obtained by the use of ammonium hydroxide in place of the sodium hydroxide.

The fatty amine employed in the present invention may contain from 8 to 22 carbon atoms. They are customarily derived from fatty acids, and accordingly in the preparation of the fatty amine, the mixed fatty acids of a fat or oil may be used, as well as any selected fraction of such acids or any individual isolated acid. The amines may be either saturated or unsaturated. The citric acid employed may be used either in the anhydrous form or in the hydrated crystalline form.

EXAMPLE 1

Dodecylamine (37 g.) and citric acid monohydrate (42 g.) are heated together in an open flask with gentle stirring. The mixture soon becomes almost solid as the salt is formed. As the temperature approaches 100° C. the mixture softens and begins to foam due to the elimination of water. The foam is kept stirred down. As the temperature rises above 100° C. the mixture slowly melts to a tan, viscous liquid. Heating and stirring are continued and aliquots are withdrawn from time to time and titrated with dilute sodium hydroxide. Heating is terminated when the neutral equivalent reaches the calculated value which, in this example, is 341. The variation of neutral equivalent with time at 150–175° C. is illustrated in Table I.

Table I

Reaction time, min.: | Neut. equiv.
--- | ---
120 | 283
160 | 298
220 | 325
280 | 335

The product from the above reaction was analyzed for N: calc'd.; 4.12%; found, 4.01%.

The sodium salt of the above product was prepared by dissolving 25 g. of it in 100 ml. of 95% hot ethanol, adding a hot solution of 3.08 g. of sodium hydroxide in 250 ml. of 95% ethanol and cooling. The salt was removed by filtration and dried. Found: 3.74% N; calc'd., 3.85% N.

The salt showed excellent surface active properties: a 0.20% solution gave 187 mm. of foam in the Ross-Miles test and a wetting time of 7.3 sec. in the canvas disc test.

EXAMPLE 2

An equivalent quantity of tetradecylamine was substituted for dodecylamine in the procedure described in Example 1.

The sodium salt of the N-tetradecylcitrimide, thus obtained, was an excellent surface active agent; a 0.25% solution gave 180 mm. of foam in the Ross-Miles test and a wetting time of 15.1 sec. in the canvas disc test.

EXAMPLE 3

An equivalent quantity of octadecylamine was substituted for dodecylamine in the procedure of Example 1. The sodium salt of the N-octadecylcitrimide, thus obtained, was only sparingly soluble in water at room temperature, but at elevated temperatures it gave a clear solution which showed high surface activity: at 75° C. a 0.25% solution gave 145 mm. of exceptionally stable foam in the Ross-Miles test and it showed a wetting time of 23.4 sec. in the canvas disc test.

I claim as my invention:

1. Compounds having the following formula:

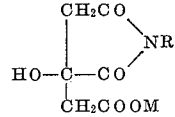

in which R is an aliphatic hydrocarbon group containing from 8 to 22 carbon atoms, and M is selected from the group consisting of hydrogen, ammonium, and alkali metal.

2. Compounds having the following formula:

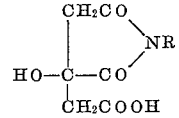

in which R is an aliphatic hydrocarbon group containing from 8 to 22 carbon atoms.

3. Compounds having the following formula:

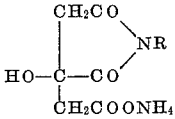

in which R is an aliphatic hydrocarbon group containing from 8 to 22 carbon atoms.

4. Compounds having the following formula:

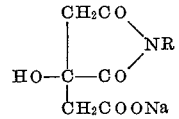

in which R is an aliphatic hydrocarbon group containing from 8 to 22 carbon atoms.

5. The sodium salt of N-dodecylcitrimide.
6. The sodium salt of N-tetradecylcitrimide.
7. The sodium salt of N-octadecylcitrimide.
8. Process of producing compounds having the following formula:

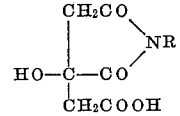

in which R is an aliphatic hydrocarbon group containing from 8 to 18 carbon atoms which comprises reacting citric acid with a primary fatty amine at temperatures in the approximate range of 100–200° C.

9. Process of producing compounds having the following formula:
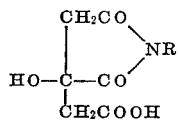
in which R is an aliphatic hydrocarbon group containing from 8 to 18 carbon atoms which comprises reacting citric acid with a primary fatty amine at temperatures in the approximate range of 150–200° C.
References Cited in the file of this patent
Beilstein, Handbuch der Organischen Chemie, vol. 22, pp. 374–5.